US010009738B2

(12) United States Patent
Shen et al.

(10) Patent No.: US 10,009,738 B2
(45) Date of Patent: Jun. 26, 2018

(54) SYSTEM AND METHOD FOR DETERMINING AN APPROPRIATE TIME FOR PROVIDING A MESSAGE TO A DRIVER

(71) Applicant: Palo Alto Research Center Incorporated, Palo Alto, CA (US)

(72) Inventors: Jianqiang Shen, Santa Clara, CA (US); Oliver Brdiczka, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days. days.

(21) Appl. No.: 14/581,975

(22) Filed: Dec. 23, 2014

(65) Prior Publication Data
US 2016/0183068 A1    Jun. 23, 2016

(51) Int. Cl.
*H04W 4/12*   (2009.01)
*G06Q 50/30*   (2012.01)
*G06Q 10/04*   (2012.01)
*B60W 40/08*   (2012.01)
*G06Q 10/10*   (2012.01)

(52) U.S. Cl.
CPC ............. *H04W 4/12* (2013.01); *B60W 40/08* (2013.01); *G06Q 10/04* (2013.01); *G06Q 10/109* (2013.01); *G06Q 50/30* (2013.01); *B60W 2040/0818* (2013.01)

(58) Field of Classification Search
CPC .......... H04M 1/66; H04M 1/607; G08B 23/00
See application file for complete search history.

(56) References Cited

U.S. PATENT DOCUMENTS

| 8,275,348 | B2 * | 9/2012 | Yen | H04M 1/6075 340/576 |
| 2002/0151297 | A1 * | 10/2002 | Remboski | B60R 16/0231 455/414.1 |
| 2004/0252027 | A1 * | 12/2004 | Torkkola | G08B 21/06 340/576 |

FOREIGN PATENT DOCUMENTS

| EP | 2314207 | 4/2011 |
| EP | 2814229 | 12/2014 |
| WO | 2002/17786 | 3/2002 |
| WO | 2013/029258 | 3/2013 |
| WO | 2003/070093 | 4/2013 |
| WO | 2013/055487 | 4/2013 |

* cited by examiner

*Primary Examiner* — Frantz Bataille
(74) *Attorney, Agent, or Firm* — Patrick J. S. Inouye; Krista A. Wittman (57) ABSTRACT

A computer-implemented system and method for determining an appropriate time for providing a message to a driver are provided. A message is received for a driver of a motor vehicle. Movement of the motor vehicle is monitored, and a familiarity of the movement to the driver is determined. Data sensed by the motor vehicle is obtained, and a cognitive load of the driver is calculated based on the familiarity of the movement and the sensed data. The message is provided to the driver when the calculated cognitive load is low.

20 Claims, 8 Drawing Sheets

SYSTEM AND METHOD FOR DETERMINING AN APPROPRIATE TIME FOR PROVIDING A MESSAGE TO A DRIVER

GOVERNMENT CONTRACT

This invention was made with government support under Contract No. W911NF-11-C-0216 ARO-Glad PC (AD-AMS). The government has certain rights in the invention.

FIELD

This application relates in general to transmitting messages and, in particular, to a computer-implemented system and method for determining an appropriate time for providing a message to a driver.

BACKGROUND

As technology improves, individuals are spending more time on their mobile telephones and handheld mobile devices, including during meetings, at the dinner table, and while driving. Many states are enacting laws to restrict or prevent drivers from talking or texting while driving to prevent accidents from occurring due to phone or device use. However, despite the changes in law, some individuals are unable to resist the temptation to check their phones or devices after hearing a message alert and continue to talk on the phone, text, or surf the Internet, even while driving.

Current attempts to address managing phone usage in a vehicle have been made. For example, U.S. Pat. No. 8,275, 348, to Yen et al., focuses on managing telephone calls in a vehicle. Different types of responses are provided to incoming calls based on a current state of a vehicle in which a recipient of the incoming call is located. An evaluation of the vehicles state determines whether the situation is safe enough for the driver to pay attention to the incoming call. The evaluation considers conversational indicators of cognitive load, which include articulation rate and backchannel responses. Therefore, Yen teaches managing phone usage by evaluating the safety of a situation based on vehicle state and cognitive load, but fails to consider any future opportunities at which a call may be better received. Further, Yen bases the cognitive load determination solely on conversational indicators of the driver during an incoming call that is already in progress, rather than considering a driver's past behavior and the driver's ability to handle a message based on his past behavior.

European Patent Application No. EP 2314207, by Werner Otto Volvo Technology Corporation, discloses a process for monitoring and managing driver attention loads. Specifically, upon detection of driver distraction, the driver's gaze is directed to a forward driving scene, such as through the vehicle's front windshield. A wave of light is initiated depending on where the driver's gaze is detected. After the wave, a large circle lights up, as well as a central line of LED lights to focus the driver's attention. This application focuses on redirecting a driver's attention, but fails to consider the driver's ability to handle an incoming message based on past driving experiences or a cognitive load of the driver.

Therefore, there is a need for an approach to determining an appropriate time for providing a message to a driver based on prior driving patterns of the driver, as well as a cognitive load of the driver.

SUMMARY

Upon receipt of an incoming message intended for a user that is driving a motor vehicle, a determination is made as to an appropriate time for providing the message to the driver, such as when the driver is stopped at a red light, when the driver is in traffic, or when the driver is close to home and on familiar roads. The appropriate time can be determined based on a cognitive load of the driver. When the driver's cognitive load is low, the message can be transmitted immediately; however, if the cognitive load is high or bordering on high, a future opportunity to provide the message can be estimated and the importance of the notification can be determined to assist in deciding whether the message should be sent immediately or at a different time. For instance, when a better opportunity is soon approaching, the message can be transmitted at the time of the better opportunity. In contrast, if the message is extremely important, the message can be delivered immediately despite the cognitive load of the user.

An embodiment provides a computer-implemented system and method for determining an appropriate time for providing a message to a driver. A message is received for a driver of a motor vehicle. Movement of the motor vehicle is monitored, and a familiarity of the movement to the driver is determined. Data sensed by the motor vehicle is obtained, and a cognitive load of the driver is calculated based on the familiarity of the movement and the sensed data. The message is provided to the driver when the calculated cognitive load is low.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Despite knowledge that talking on a phone or texting while driving is dangerous, many individuals are so connected to their phones and mobile devices that they continue to drive, and talk or text. Current technologies help regulate phone use while driving, yet fail to consider many important factors, such as past driving experiences of the message recipient that can be used to accurately determine an appropriate time for delivering the message. Determining the appropriate time and sending an incoming message only when appropriate facilitates compromise between when the driver receives a message and safety of the driver and other drivers.

Figure 1:
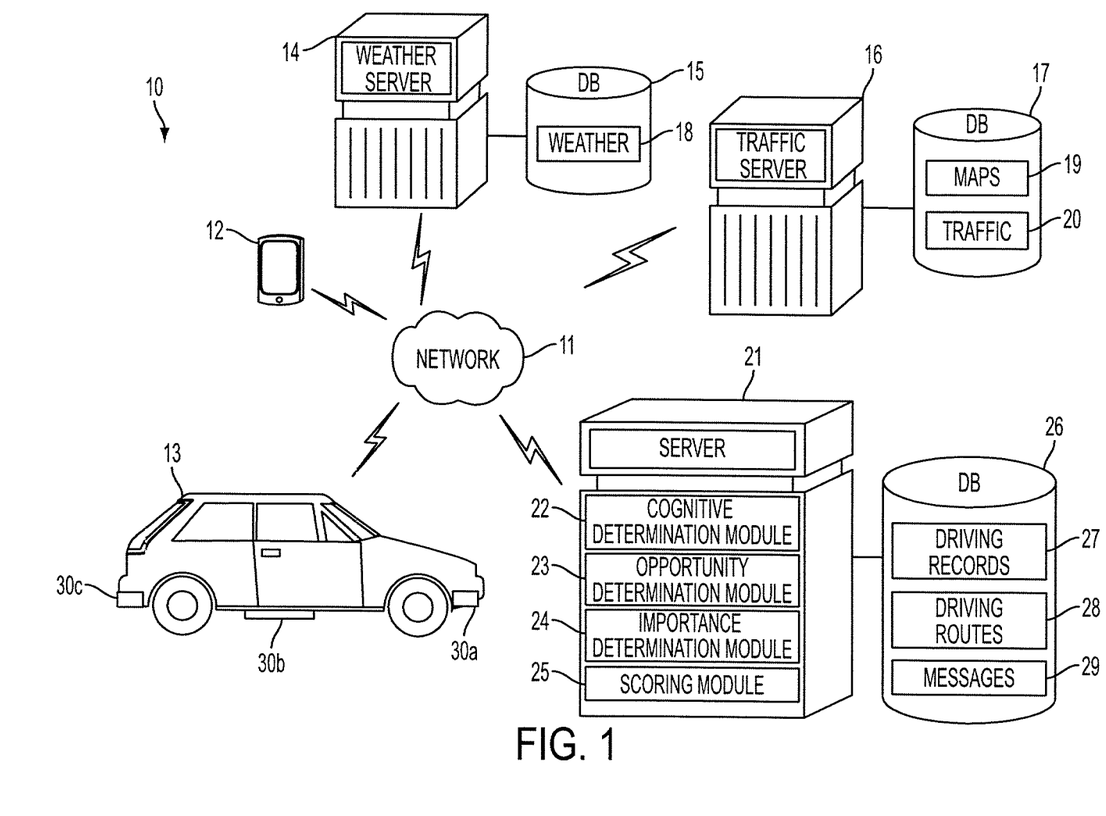
FIG. 1 is a block diagram showing a computer-implemented system for determining an appropriate time for providing a message to a driver, in accordance with one embodiment.

An appropriate time for sending a message can be determined based on multiple factors, including data obtained from the vehicle being driven. FIG. 1 is a block diagram showing a computer-implemented system for determining an appropriate time for providing a message to a driver, in accordance with one embodiment. A sender transmits a message 29 intended for a user recipient who is determined to be driving a motor vehicle 13. The message can include a text message, recommendation, email message or social network alert, and can be transmitted from the sender via a mobile telephone 12, laptop (not shown), desktop computer (not shown), tablet (not shown), or another mobile hand held device. The message is intercepted by a server 21 that is interconnected to the mobile phone 12 via an internetwork, such as the Internet, and stored in a database 26 connected to the server 21. To prevent an accident, the message can be delivered to the user recipient after an appropriate time for sending the message has been determined.

The server 21 includes a cognitive determination module 22, an opportunity determination module 23, an importance determination module 24, and an appropriateness determination module 25. The cognitive determination module 22 obtains traffic data and information regarding road conditions from third party databases. For instance, the cognitive determination module 22 can obtain maps 19 or traffic data 20 from a database 17 interconnected to a traffic server 16. Additionally, the cognitive determination module 22 can obtain weather data 18 stored in a database 15 interconnected to a weather server 14. Other types of data can be obtained. The cognitive determination module 22 can also access data from sensors 30a-c affixed to the motor vehicle 13. The sensors 30a-c can be affixed to a front 30a, middle 30b, or back 30c of the vehicle 13 to detect a proximity of other vehicles, a speed or acceleration of the vehicle, whether the vehicle is braking, or turning, and whether a horn is sounding, as well as other sensed data. After the road condition, weather, and sensor data is collected, the cognitive determination module 22 can determine a cognitive load of the driver at a particular location and assign a score for the determined cognitive load.

Meanwhile, the opportunity determination module 23 accesses historical driving records 27 for the user and frequently traveled routes 28 from the database 26 to determine whether a better opportunity exists for providing the message to the user in the near future. The importance determination module 24 determines an importance of the message 29 based on a sender of the message and content of the message 29. Finally, the appropriateness module 25 analyzes the cognitive load of the user, any existing future opportunity, and the importance of the message to determine whether the current time for transmitting the message to the user is appropriate or whether the message should be provided at a future opportunity.

The desktop computer, mobile computing devices, and server can each include a central processing unit and one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the computing devices and server can act as a specialized computer. For instance, when the modules are implemented as hardware, that particular hardware is specialized to perform message prioritization and other computers cannot be used. Additionally, when the modules are burned into read-only memory components, the computing device or server storing the read-only memory becomes specialized to perform the message prioritization that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
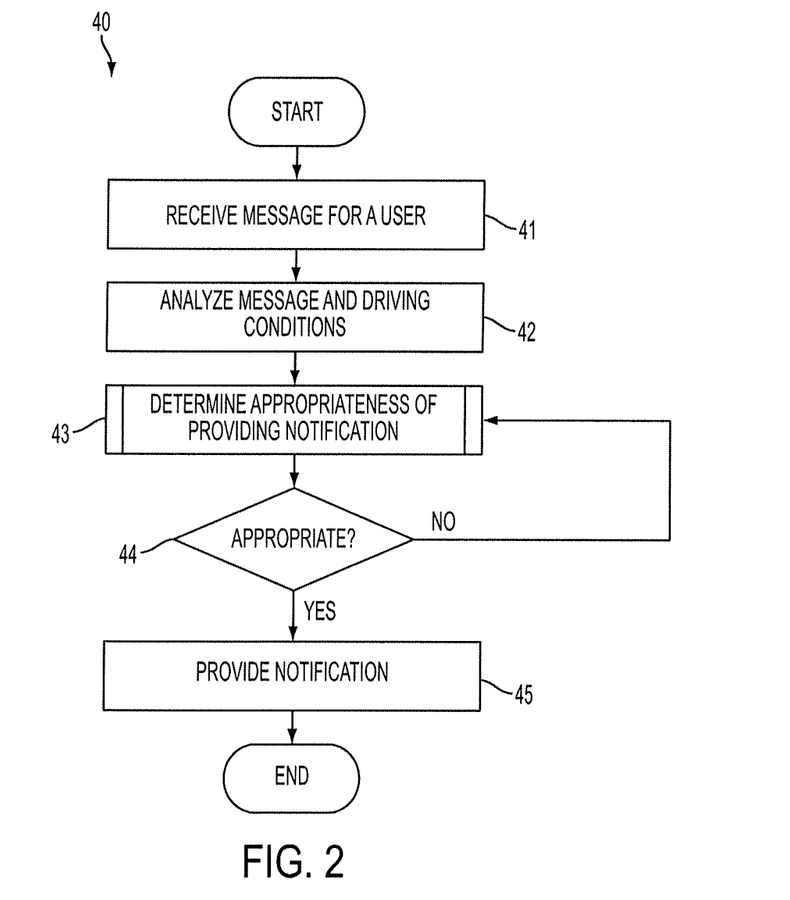
FIG. 2 is a flow diagram showing a computer-implemented method for determining an appropriate time for providing a message to a driver, in accordance with one embodiment.

Determining an appropriate time for providing a message to a user while driving can help prevent accidents by only delivering the message when the user is least occupied and best able to handle an incoming message. FIG. 2 is a flow diagram showing a computer-implemented method 40 for determining an appropriate time for providing a message to a driver, in accordance with one embodiment. A message from a sender and directed to a user is received (block 41). The message and driving situation of the user is analyzed (block 42). A determination (block 43) is made as to whether the current time, or time of receipt of the message, is appropriate for delivering the message to the user, or whether a better opportunity exists. The determination can be based on an appropriateness score, which can be calculated based on GPS data, sensor information from the vehicle, past driving routes and records of the user, road and traffic information, as well as other types of data, as further described below with references to FIGS. 3, 4, 6, and 7.

A high appropriateness score indicates that the current time is most appropriate for sending the message, while a lower score indicates that the current time is less appropriate for transmitting the message. In one embodiment, an appropriateness threshold can be applied to determine whether the score for a current time is high enough to be considered appropriate (block 44). If so, the message can be provided (block 45). However, if the score fails to satisfy the threshold, the current time is considered inappropriate (block 44), and a further analysis can occur. The further analysis can occur at predetermined time intervals or randomly until an appropriate time is determined and the message is delivered.

Figure 3:
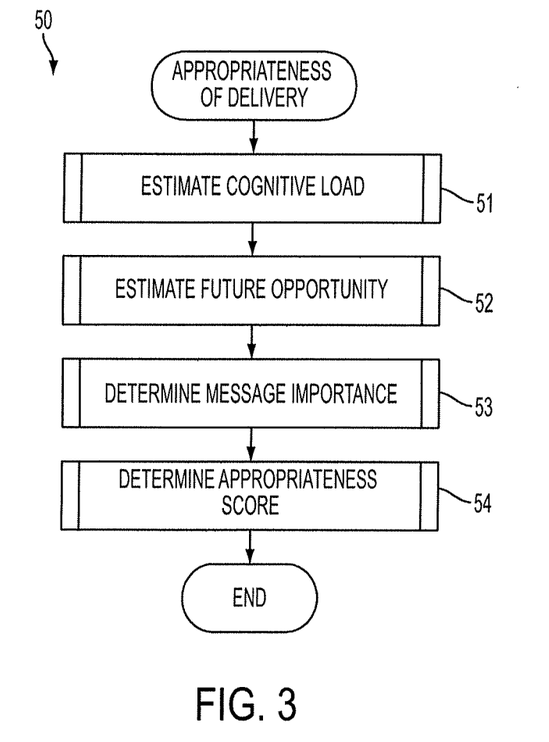
FIG. 3 is a flow diagram showing, by way of example, a process for determining an appropriateness of message delivery.

To determine the appropriateness score, multiple factors are considered, including the driver's level of mental processing, the environment and conditions surrounding the driver, and an importance of the message. FIG. 3 is a flow diagram showing, by way of example, a process for determining an appropriateness score. First, a cognitive load of the driver is calculated (block 51) to determine whether the driver is currently able to handle receipt of the message and the distraction caused by receipt of the message. The cognitive load of a user refers to a total amount of activity imposed on the user's working memory, and thus, the amount of mental processing required of the user. For instance, when the driver's cognitive load is high, the driver is less able to handle viewing a message due to the high amount of mental processing required. Conversely, when the cognitive load of the driver is low, the driver may be better able to handle viewing the message since less processing is required by the driver. Determining the cognitive load is further described below with reference to FIG. 4.

Additionally, a determination regarding whether a better opportunity exists (block 52) in the future for presenting the message is made. Specifically, a route of the driver is determined and used to determine a location along the route that may be a better opportunity for presenting the message to the driver than the current time. Determining whether a future opportunity exists is discussed in detail, infra, with respect to FIG. 5. An importance of the message is also determined (block 53) to help identify whether the message should be immediately delivered to the user or whether the message delivery can wait for a better opportunity. Determining the message importance is further discussed below with reference to FIG. 6. Subsequently, the appropriateness score is determined (block 54) based on the cognitive load, future opportunity, and message importance factors.

Figure 4:
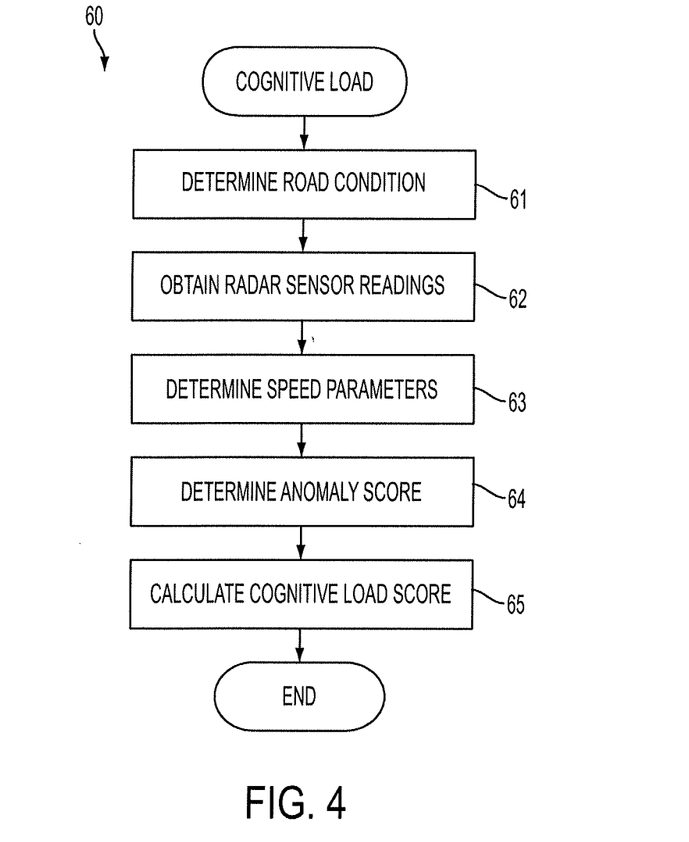
FIG. 4 is a flow diagram showing, by way of example, a process for determining a cognitive load of a driver.

The cognitive load factor provides a level of mental processing required by a user based on the user' surrounding environment and driving conditions. FIG. 4 is a flow diagram showing, by way of example, a process 60 for determining a cognitive load of a driver. The driver's cognitive load can be based on multiple factors surrounding a current driving condition of the driver at a particular time and location. A location of the user is identified using, for example, a global positioning system ("GPS") that can be positioned on or within the motor vehicle of the user to determine a location of the vehicle. The location of the motor vehicle can then be identified on a map using the GPS coordinates to determine the surrounding environment and driving conditions of the driver's location, such as if the driver is stopped at a light or sign or in traffic.

Conditions of the road on which the user is driving are determined (block 61). The road conditions can include the speed limit, traffic density, traffic lights, and number of lanes, as well as other conditions. Information regarding the road conditions can be obtained from data provided by third parties, such as Google Maps, by Google Inc., Mountain View, Calif. and traffic reports from local news stations. Other types of information and information sources are possible. Further, a camera can be used to track conditions, such as weather or motor vehicle proximity to other vehicles, as well as user facial expressions.

Radar sensor readings from the driver's motor vehicle can also be obtained (block 62) and used in the cognitive load determination. The sensors can be positioned on or within the motor vehicle, such as on a front, back, top, bottom, or side of the vehicle to obtain data, including a distance to a vehicle in front of the driver and a distance to a vehicle behind a driver. In-car sensors can be used to obtain occupancy data or information regarding an action by the motor vehicle, such as whether the brakes are on, a position of the steering wheel, whether the horn is pressed, or whether a turn signal or emergency lights are on. To determine occupancy, a sensor can be positioned under each car seat and when a person sits in one of the seats, the sensor senses the weight of the person. Further, the sensors can be used to determine a speed and acceleration (block 63) of the motor vehicle.

An anomaly score of the user's actions given the road condition and sensor readings is calculated (block 64). The anomaly score measures the user's departure or deviation from "normal," or regular actions and can include a speed anomaly, route anomaly, as well as other types of anomalies. A speed anomaly measures an amount of deviation between a user's current speed and an average speed. For example, a user will generally drive slower than normal in unfamiliar locations. A route anomaly identifies a route travelled by the user that is different from any other prior traveled routes of the user. An anomaly can indicate a high cognitive load of the user, such as when the user is driving in an unfamiliar location.

The anomalies can be determined using a Support Vector Machine ("SVM") or via clustering. When an SVM is used, an anomaly model is first built using historical data of the driver. Specifically, the historical data includes known anomalies that are beyond the boundaries of normal ranges. The anomalies are identified and categorized as anomalies, while the normal or average data is separately categorized. The historical data includes the driver's past records of road conditions, sensor readings, and speed parameters, which are obtained over a period of time. Once built, the model is a representation of the separate categories for normal or expected data, and anomalies. As new data is received, the data is mapped using the model to determine whether the data resembles expected data or an anomaly. Based on where the new data is located with regards to the model, an anomaly score is assigned.

In a further embodiment, the anomaly score can be determined via a standard clustering algorithm, such as k-means clustering. For example, the historical data of the driver is clustered. As new data is received, the data is compared to the centers of each previously-formed cluster and a distance of the data from each of the cluster centers is determined. The anomaly score is determined to be the distance of the data to one of the clusters. The longer the distance, the more dissimilar the data from the cluster and the higher the anomaly.

In one example, a user, Bill, is driving from the University of Washington to downtown Seattle in rush time traffic. Bill travels this route Monday through Friday to attend his internship after school. Generally, Bill travels alone; however, today, two of his friends have asked to catch a ride with Bill so they can watch a movie at the theatre downtown. Bill and his friends have just entered I-5 highway from the entrance ramp off 45th Street NE when a sender, Leslie, transmits a text message intended for Bill. The text message is intercepted by a message server and includes a request for Bill to perform last minute revisions on a group project that is due tomorrow.

Bill's location is identified via GPS and is used to determine the road conditions of Bill's current location. Further, radar sensor readings are obtained from the motor vehicle to determine speed parameters. Based on the location data, Bill is determined to be on the I-5 highway, which has multiple lanes, and the road conditions at Bill's location indicate that he is in traffic, with other vehicles surrounding him, and not near any stop lights. Specifically, readings from the radar sensors indicate that a motor vehicle is located 3 feet in front of the driver's motor vehicle and another motor vehicle is located two feet behind the driver's motor vehicle. The sensors also determine that Bill's motor vehicle is moving slowly, the brakes are not applied, and two passengers are riding in the motor vehicle. No anomaly regarding speed or route are identified as Bill frequently travels this same route at the same time. However, Bill's friends are identified as being in the car, which is a departure from Bill's "normal" actions since Bill usually drives to downtown Seattle alone. Upon identification of the passengers, an anomaly score is generated since the presence of passengers can increase Bill's cognitive load.

Finally, based on the road condition, sensor readings, speed parameters, and anomaly score, the cognitive load score of the user is determined (block 65). The overall cognitive load can be determined via rules written by domain experts or machine learning, as further described below. Once determined, the cognitive load plays a role in determining whether to send a message to a recipient user at the time of receipt. The cognitive load score can be a value between zero and one. A high cognitive load score generally assumes that the user is distracted and unlikely to be able to handle the message. Meanwhile, if the user's cognitive load is lower, the user has more processing capacity to focus on the message.

Figure 5:
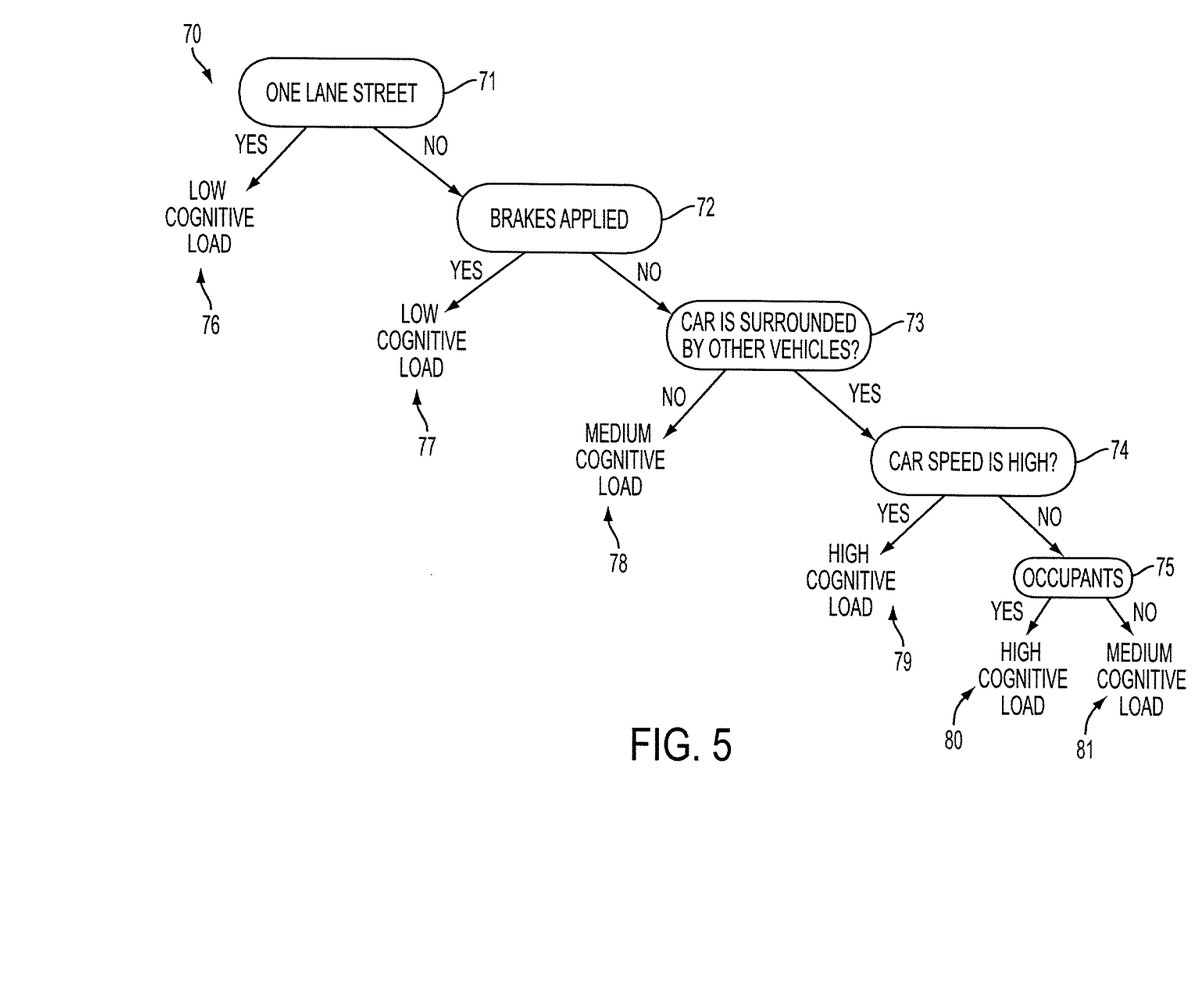
FIG. 5 is a block diagram showing, by way of example, a decision tree for determining a cognitive load of a driver.

A rule-based determination provides insight as to how multiple factors affect the user's cognitive load. FIG. 5 is a block diagram showing, by way of example, a decision tree 70 for determining a cognitive load of a driver. The decision tree 70 is generated from rules provided by experts that guide a determination as to a level of cognitive load experienced by the user. For example, the rules provided by an expert can include the following:

Rule 1: When the road is a one lane street 71, the user experiences a low cognitive load 72.

Rule 2: When the road is not a one lane street 71 and the brakes are applied 72, the user experiences a low cognitive load 77.

Rule 3: When the road is not a one lane street 71, the brakes are not applied 72 and the user's motor vehicle is surrounded by cars 73, the user experiences a medium cognitive load 78.

Rule 4: When the road is not a one lane street 71, the brakes are not applied 72, the user's motor vehicle is surrounded by cars 73, and the speed of the vehicle is high 74, the user experiences a high cognitive load 79.

Rule 5: When the road is not a one lane street 71, the brakes are not applied 72, the user's motor vehicle is surrounded by cars 73, the speed of the vehicle is not high 74, and occupants are present 75, the user experiences a high cognitive load 80.

Rule 6: When the road is not a one lane street 71, the brakes are not applied 72, the user's motor vehicle is surrounded by cars 73, the speed of the vehicle is not high 74, and no occupants are present 75, the user experiences a medium cognitive load 81.

The rules are entered into a decision tree, as shown in FIG. 5. Current vehicle data obtained is then applied to the decision tree to determine a cognitive load of the user. The decision tree can include a series of nodes and edges that are organized based on the rules. As the tree is traversed based on the vehicle data, binary values or weights can be assigned. For example, returning to the above example with Bill and his friends, Bill's cognitive load is determined by traversing through the decision tree based on the data collected. Starting at node 71, Bill is driving on I-5, which is a multi-lane highway, so the analysis moves to node 72, which considers whether Bill has applied the brakes. Since Bill is not currently applying the brakes, the density of traffic is analyzed at node 73. Bill is in traffic and his vehicle is surrounded by other vehicles. Next, at node 74, a determination is made as to the speed of Bill's motor vehicle. Bill is driving slowly 74 and occupants is determined to be present at node 75. Since Bill is driving two passengers, a determination is made that Bill's cognitive load is at a medium level, and a cognitive load score of 0.5 is assigned.

In a further embodiment, particular values can be assigned to each edge extending from a node. For example, with respect to node 71, if a user is driving on a one lane highway, the user may receive a value of 0 or 0.1, whereas the user will receive a value of 0.4 if he is not driving on a one lane road. After traversing through the decision tree, the values can be totaled as the cognitive score or an average of the total values can be calculated as the cognitive score.

The cognitive load can also be determined using machine learning. As described above, a model is first generated. The model for cognitive load can be built using training data, including historical records of vehicle data. In one embodiment, the model can include multiple vectors of factors and a cognitive level associated with each vector based on the factors. The historical data can come from a population of other drivers or can be obtained from the current user, and can include average speed, braking data, routes preferred, such as arterial street versus side street preferences, and occupancy data. Alternatively, the model can be based on a generic population of users and subsequently refined for the user based on personalized data. Subsequently, current vehicle data obtained for the user is mapped via the model to determine the cognitive load of the user. Specifically, a vector with the different vehicle data factors can be formed for the current data and numerical values, such as between zero and one, or binary values can be assigned to each factor. For example, the vector can include the factors for speed, route, and occupancy, such as $\vec{S}_A=\{$(speed, 0.5), (route, 0.75), (occupancy, 0.6)$\}$. Subsequently, the vector is compared with the model vectors and a score for the cognitive load is determined.

In a further embodiment, historical data observations, such as times and situations when the user utilizes his phone or other mobile device can be used to help determine cognitive load. A user is generally more likely to use his phone when he is in a low stress situation and has the capacity to talk or read a message. For instance, a user may open and read a message while he is stopped at red light, has his foot on the brakes, is driving in a low traffic area, or has no occupants. In contrast, the historical records can show that the user does not use his phone when driving on the freeway at fast speeds or with occupants. Thus, times or scenarios when the user uses his phone can be identified as a low cognitive load of the user, while times or scenarios when the user does not use his phone can be identified as high cognitive load. The historical phone usage records provides data as to what and when the driver thinks is a convenient time to use the phone and encourages transmission of the message during a convenient time, as defined by the user.

Figure 6:
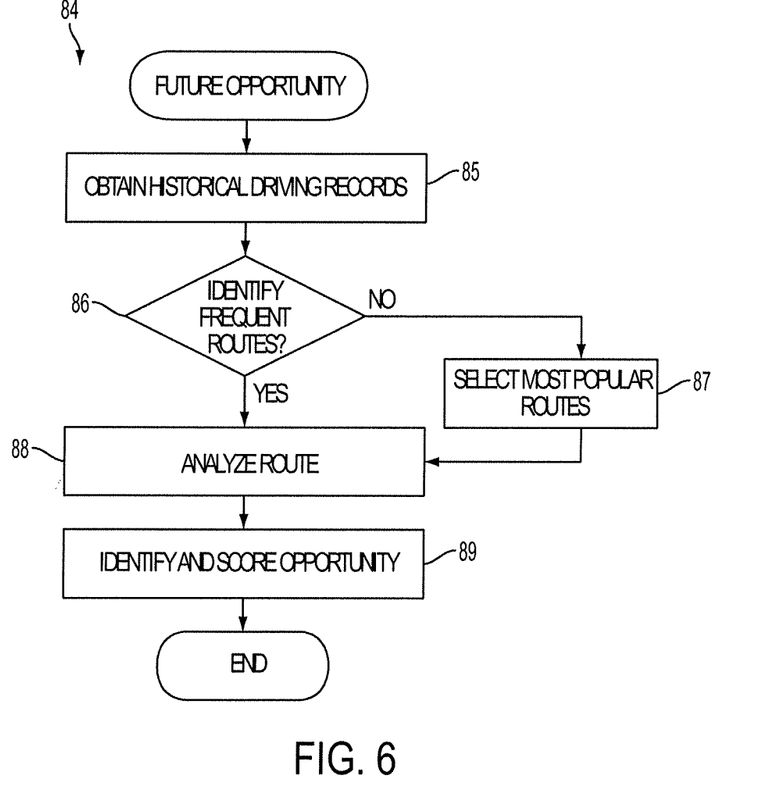
FIG. 6 is a flow diagram showing, by way of example a process for determining a future opportunity for providing a message to a driver.

A message can be transmitted based only on the user's cognitive load; however, when the cognitive load is in the middle, such as 0.5 or 0.6 out of 1.0, a further factor should be considered to confirm whether the current time is truly appropriate for providing the message to the user. Future opportunities for providing the message and message importance are factors that can help determine an appropriate time for transmitting the message to the user. FIG. 6 is a flow diagram showing, by way of example a process 84 for determining a future opportunity for providing a message to a driver. Specifically, an estimate regarding whether there is any opportunity in the future to present the message with limited distraction to the user is determined. First, historical driving records of the user are obtained (block 85) over the last n-months. The number of n-months can be automatically determined or predetermined via the system or an expert. The historical driving records can include previously traveled routes of the user. From the previously traveled routes, one or more frequently traveled routes that match the driver's current driving direction are identified (block 86). The frequently traveled routes can be identified as those previously traveled routes that have been used at least a k number of times. The value of k can be automatically determined or predetermined via the system or an expert.

If no frequently traveled routes are identified (block 86), routes most popular among other drivers in the user's direction are selected (block 87). The most popular routes can be based on aggregated historical data from different drivers or based on labeled routes by domain experts. The frequently traveled routes or most popular routes are then analyzed (block 88) and one of the routes is selected (block 89). When multiple frequently traveled routes or popular routes exist, an average time of each of the routes is determined. Then, the route with the average time that is closest to the driver's current driving time is selected. Alternatively, if only a single frequently traveled route or popular route exits, that route is selected. Finally, the selected route is used to identify (block 86) whether any good opportunities exist to present the notification to the driver and a future opportunity score is generated. Expert rules designed by domain experts can be used to determine whether a good opportunity exists. For example, a good opportunity may include stoplights or stop signs, as well as low speed streets, and infrequently traveled roads. Values can be associated with each of the rules to calculate the future opportunity score.

Returning to the above example, Bill is travelling from the University of Washington to downtown Seattle. Since Bill is heading south on I-5, Bill's historical driving records are analyzed to determine whether any previously traveled routes match Bill's current driving direction. As Bill drives this route Monday through Friday to go to work, the route from the University of Washington to Bill's workplace is identified, as well as a route from the University of Washington to Bill's favorite restaurant in West Seattle, which Bill frequents. West Seattle is located southwest of downtown Seattle and Bill passes downtown as he drives to West Seattle. Since there are multiple frequent routes that match Bill's current route, the average time of each route is reviewed. The work route is 20 minutes, while the restaurant route is 30 minutes. As provided above, Bill just entered the I-5 highway when a sender transmits a text message intended for Bill. At this point, Bill has been driving for about 6 minutes. Therefore, the route to Bill's work is selected since this route is the closest to Bill's current driving time. In a further embodiment, time of day can be considered. For example, if Bill is driving at 7:30 a.m. on a Monday morning and is heading south on I-5, he is most likely going to work.

The selected work route is analyzed and a future opportunity for providing the message is identified on a stretch of I-5 between the 45$^{th}$ street entrance and the Mercer Street exit since this stretch is generally always backed up and traffic is very slow, around 20 miles per hour. A further future opportunity is identified at the Union Street exit, which is about 7 minutes form Bill's current location. A stoplight is located right off the exit at a busy intersection so the length of a red light can be fairly long. Based on the multiple instances of future opportunities, the quality of each future opportunity and the proximity of the future opportunities, a high future opportunity score of 0.8 is provided.

Figure 7:
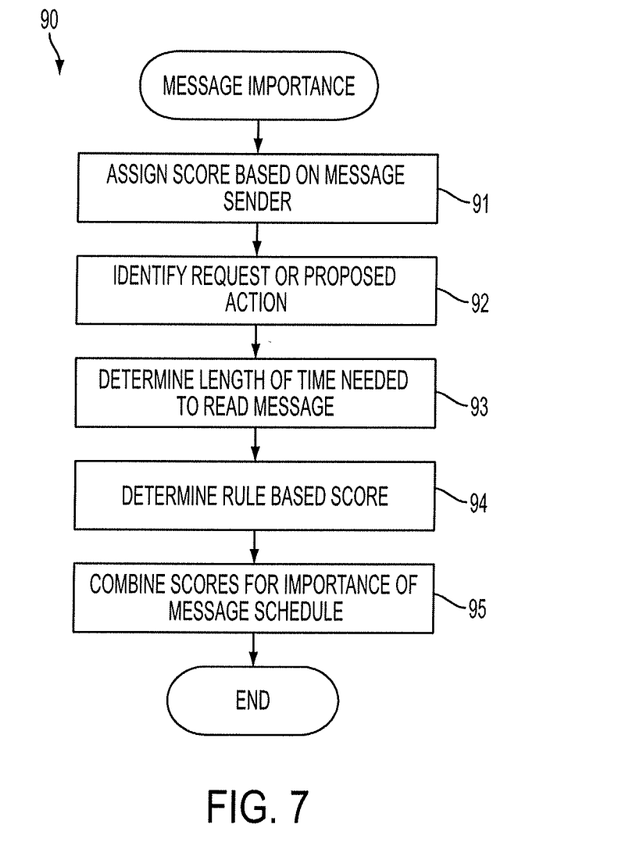
FIG. 7 is a flow diagram showing, by way of example, a process for determining an importance of a message to be delivered.

Another factor used to determine an appropriate time for delivering a message to a user includes message importance. For example, important messages are more appropriately provided to the user in a timely fashion despite a higher cognitive load. FIG. 7 is a flow diagram showing, by way of example a process 90 for determining an importance of a message. The message importance can be based on multiple factors, as described in further detail in commonly-owned U.S. patent application Ser. No. 14/581,945, titled "Computer-Implemented System and Method for Prioritizing Electronic Messages Based on Importance," filed on Dec. 23, 2014, the disclosure of which is hereby incorporated by reference. To determine message importance, the message intended for the driver is analyzed to determine a sender of the message and a score is assigned based on the sender's importance to the user (block 91). A perceived importance based on the sender is determined across multiple communication channels, social networks and contexts. The score is then based on the communication patterns to determine an importance of the sender. For example, the sender is considered important when he is associated with the user across multiple social networks and frequently communicates with the user. In one embodiment, the score can be binary with one value indicating an important sender, while the other value indicates a sender that is not important. Alternatively, a continuum of scoring, such as between zero and one can be used to represent the importance of the sender.

The message is further analyzed to determine whether the message includes a request or proposed action (block 92). To determine whether a request or action is present, a speech act taxonomy is applied to the message to identify terms in the message that are representative of a request or action. The speech act taxonomy can be divided into verbs and nouns, while each email message is represented by one or more verb-noun pairs. For example, an email proposing a meeting would include the labels "propose" and "meeting." The most common speech act verbs to identify a request or action are deliver, request, commit, and propose, and the most common nouns are meeting and data. A pretrained speech predictor is used to identify the speech acts in the message. The predictor can be trained to recognize the speech acts based on a large email dataset using machine learning methods, such as support vector machines. A higher score is assigned to messages that require immediate actions from the user, such as those messages with high request or propose scores.

Additionally, a length of time necessary to read the message is determined (block 93) based on a length of the message, as well as other factors, such as a difficulty of the language and a complexity of the sentence structure used. In one embodiment, the reading time duration D is approximated based on a count of terms c included in the message using the following equation:

$$D = \frac{0.5}{(1 + e^{7.0*(c/100-0.6)}) + 0.5} \quad (1)$$

where e is the base of the natural logarithm and $e^x$ calculates the exponential value of x.

A rule based score for the message is also determined (block 94). The rules can include assigning a particular score based an identity of the sender, assigning a score based on particular words that appear within the message, and assigning a particular score based on identified word combinations. Each of the rules are applied to the message and scores are assigned based on each of the rules. Subsequently, the scores are totaled for an overall rule based score.

Once scores have been assigned to each of the four importance factors, including sender importance, inclusion of a request or action, message duration, and applied rules, the scores are totaled to determine a score representative of the message's importance. Further different weights can be associated with each of the factors prior to totaling the scores.

Returning to the above example, Leslie transmits a message intended for Bill that includes "please proof the handout for tomorrow's presentation." The sender, Leslie, is identified as being important since Bill and Leslie have been messaging each other frequently due to their shared work on the project and are connected via multiple social networking sites. The action requested by Leslie is identified and a length of time needed to review the message is determined to be short. A value of 0.7 is assigned as the message importance score.

Figure 8:
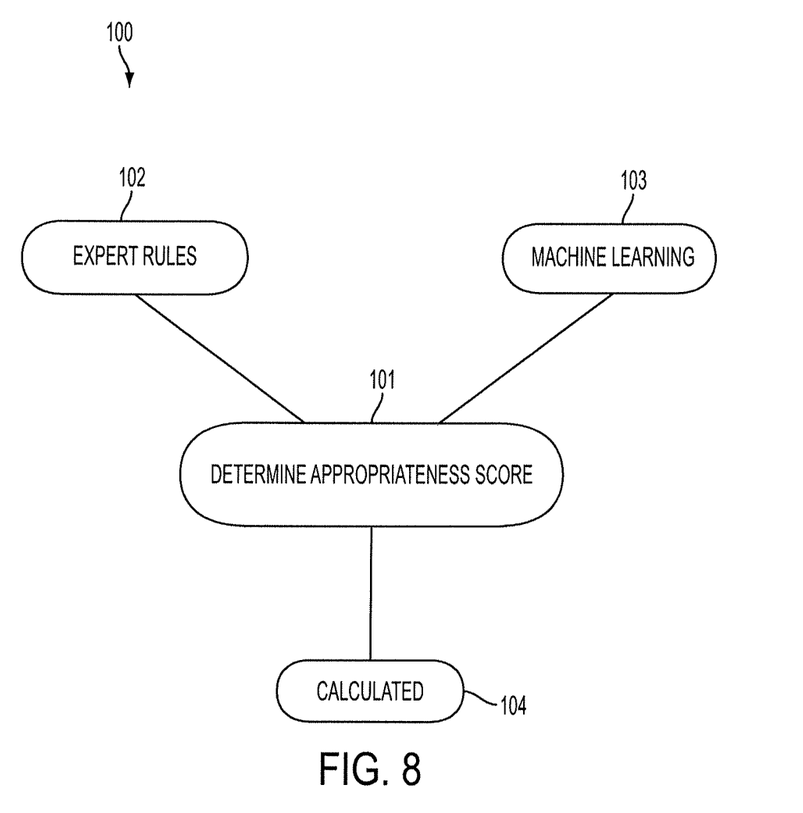
FIG. 8 is a block diagram showing, by way of example, processes for determining an appropriateness score.

Finally, the appropriateness score for determining whether to provide the intended message to the user can be determined based on the cognitive load, future opportunity, and message importance. FIG. 8 is a block diagram showing, by way of example, processes 100 for calculating an appropriateness score 101. The appropriateness score 101 can be determined via rules written by domain experts 102, machine learning methods 103, or by totaling 104 the individual scores for cognitive load, future opportunity, and message importance. A high appropriateness score indicates that the message is most appropriate for delivering to the user, while a low appropriateness score indicates less appropriateness for sending the message.

Prior to determining the appropriateness score, the cognitive score and the future opportunity score can be normalized. As provided above, a high cognitive load indicates that a high level of mental processing is required of the user, and thus, the user is unlikely able to handle the message, which would require further mental processing, and sending of the message is inappropriate. Meanwhile, a high future opportunity score indicates that one or more future opportunities exist, which generally decreases the appropriateness of providing the message at a current time, while a low score indicates that a future opportunity is unlikely and the appropriateness of providing the message to the user is high. Therefore, the cognitive load score and future opportunity score should be normalized so the factors are properly considered for calculating the appropriateness score. Normalization can include inverting each of the cognitive load and future importance scores. The inversion ensures that the appropriateness score is high when the cognitive load is low and when the future opportunity is low. Other types of normalization are possible.

Rule based scoring for the appropriateness score relies on rules written by experts. For example, if the cognitive load score is above 0.2, the future opportunity score is above 0.35, and the message importance is above 0.5, then the message is immediately provided to the user. Further, if the cognitive load score is above 0.3, the future opportunity score is above 0.6, and the message importance is above 0.5, then wait for the soonest future opportunity. Other rule based examples can consider one or more of the factors. For example, when the normalized score for cognitive load is 10 or above, the message should be immediately transmitted to the user since the total amount of activity imposed on the user's working memory is low and the user is likely able to handle receipt of the message. Additionally, if the cognitive load score is a little lower, such as 7, but the message is extremely important, the message can be immediately provided to the user without any consideration as to future opportunities. Any number of rules can be defined as determined necessary. Alternatively, to simplify the appropriateness score determination, a predetermined number of rules may apply.

Machine learning methods 103 for determining the appropriateness score can utilize a support vector machine. Combinations of the driver's cognitive score, future opportunity score, and message importance score are labeled by domain experts with an appropriateness score and provided as training material to build a model for assigning an appropriateness score for further received combinations of the driver's cognitive score, future opportunity score, and message importance score. The model can be built using training data, including historical records identifying when the user or users have previously accepted the message and when the user or users have previously denied the messages, as well as the environment surrounding the users' decision. Subsequently, the obtained cognitive score, future opportunity score, and message importance are compared to the model and an appropriateness of providing the message to the user at the current time is determined.

Further still, the appropriateness score can be calculated by totaling the cognitive load, future opportunity, and message importance scores, taking the average of the scores, or calculating the mean of the scores. In one embodiment, predefined weights can be assigned to each of the factors as shown by the equation below:

$$A = w_1*CL + w_2*FO + w_3*MI \qquad (2)$$

where CL is the normalized score for cognitive load, FO is the normalized score for future opportunity, and MI is the score for message importance. Each of the weights are represented by $w_1$, $w_2$, and $w_3$. Other processes or equations for calculating the appropriateness score are possible.

To determine whether a situation arises to a level of appropriateness required for providing the message to the user, a threshold can be applied. In one example, the threshold can be 9 and any appropriateness scores equal to or above the threshold could dictate providing the message to the user. Other threshold values are possible.

For example, returning to the above example, Bill is currently entering the I-5 expressway and will be getting off in three exits, at Union Street. A cognitive load score of 0.5 has been assigned, two future opportunities for providing the intended message to Bill have been identified and a score of 0.8 is assigned, and the importance of the message is determined as 0.7 since the message includes an action that Bill must complete before tomorrow. The scores for cognitive load and future opportunity are normalized by taking the inverse and the normalized scores are now 2 for cognitive load and 1.25 for future opportunity. By totaling the scores for the cognitive load, future opportunity and message importance, an appropriateness score of 3.95 is calculated. The predefined threshold for providing the message to the user is 9. Therefore, since the appropriateness score is below the threshold, the message is not currently provided to Bill. However, Bill's location and activity is still monitored and the message is provided at a further time, such as at one of the identified future opportunities based on an appropriateness score at that opportunity.

The above-identified processes for determining the appropriateness score provide a yes or no answer regarding whether the message should be currently provided to the user. However, a determination of whether to provide the message to the user can be based on a scoring continuum, such that an appropriateness score is assigned to the current instance when the message intended for the user is received by the server, as well as assigned to identified future opportunities so the best opportunity for providing the message along the user's route can be identified. The appropriateness for providing the message at an identified future opportunity can be based on the user's cognitive load, other future opportunities, and the message importance, as well as other factors, including a distance of the future opportunity from the user's current location and a quality of the future opportunity. For example, a traffic light may be identified as a future opportunity and the quality of the opportunity can be based on a length of a red light at the intersection. The longer the red light, the higher quality opportunity since a user stops at the red light and generally has a low cognitive load.

In a further embodiment, determining an appropriate time for sending a message to a driver can be used for driver communication within an audio centric network, as described in U.S. patent application Ser. No. 14/582,005, titled "System and Method for Facilitating Driver Communication via an Audio Centric Network," filed on Dec. 23, 2014, the disclosure of which is hereby incorporated by reference. Specifically, drivers in nearby vicinities can verbally communicate with one another while driving by selecting another driver within a predetermined range and initiating contact.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for determining an appropriate time for providing a message to a driver, comprising:
   a sensor to monitor movement of a motor vehicle and determining a familiarity of the movement to a driver of the motor vehicle; and
   a server comprising memory, a central processing unit, an input port, and an output port, wherein the central processing unit is configured to:
   receive messages for the driver;
   determine an appropriateness for delivering each message, comprising:
      obtain data sensed by the motor vehicle;
      calculate a cognitive load of the driver by analyzing one or more cognitive factors comprising at least one of the monitored movement and the sensed data, determining an anomaly score for at least one of the cognitive factors by measuring a deviation of one such analyzed cognitive factor for the driver, and calculating the cognitive load based on the anomaly scores of the analyzed cognitive factors;
   identify a range of cognitive load values and designate a middle portion of the values as a mid-range; and
   perform an action based on where the cognitive loads of the messages fall within the range of values, comprising:
      withhold those messages from the driver that are associated with the cognitive loads that fall above the mid-range;
      perform a further analysis of the appropriateness of delivery of those messages associated with the cognitive loads that fall in the mid-range comprising determine an appropriateness value based on at least one appropriateness factor; and
      provide those messages to the driver when the cognitive loads are lower than the mid-range.

2. A system according to claim 1, wherein the central processing unit further determines that a future time provides a better opportunity for providing the message to the driver and transmits the message to the driver at the future time when the calculated cognitive load is high.

3. A system according to claim 1, wherein the central processing unit further records mobile phone usage of the driver while driving, identifies at least one of when and where the driver is using the mobile phone when driving, and assigns a low cognitive subscore when the driver is determined to be using the mobile phone.

4. A system according to claim 1, wherein the central processing unit further calculates a score for the cognitive load by determining a condition of a road on which the driver is driving the motor vehicle, by obtaining readings of radar sensors positioned within the car, by determining a speed of the motor vehicle, by determining whether the driver is performing actions while driving the motor vehicle that are similar to prior actions based on the road condition, radar sensor readings and motor vehicle speed, and by determining the cognitive score of the driver based on a similarity of the actions determined, the road condition, the radar sensor readings, and motor vehicle speed.

5. A system according to claim 1, wherein the central processing unit further determines the cognitive load via one of a decision tree and machine learning.

6. A system according to claim 1, wherein the central processing unit further determines whether a future opportunity presents a better time for providing the message to the driver and transmits the message to the driver at the future time when the opportunity is determined to be better.

7. A system according to claim 6, wherein the central processing unit further estimates the future opportunity for providing the message to the driver by identifying at least one route that fits a current driving direction of the motor vehicle, by analyzing the identified route, and by identifying a location along the route as the future opportunity.

8. A system according to claim 7, wherein the central processing unit further determines the frequent route by identifying a previously travelled route by the user and by identifying one or more most popular travelled routes amongst other drivers.

9. A system according to claim 1, wherein the central processing unit further determines an importance of the message for the driver by determining a sender of the message, by identifying at least one of a request and proposed action within the message, by determining a length of time required to present the message, and by calculating the importance based on the determined sender, identified request or proposed action, and length of time.

10. A system according to claim 1, wherein the central processing unit further determines whether a future opportunity exists to present the message to the user, determines an importance of the message to be presented to the user, and calculates an appropriateness score for presenting the message to the user based on the cognitive load, future opportunity, and message importance.

11. A computer-implemented method for determining an appropriate time for providing a message to a driver, comprising:
   receiving messages for a driver of a motor vehicle;
   monitoring movement of the motor vehicle and determining a familiarity of the movement to the driver;

determining an appropriateness for delivering each message, comprising:
    obtaining data sensed by the motor vehicle;
    determining a cognitive load of the driver, comprising:
        analyzing one or more cognitive factors comprising at least one of the monitored movement and the sensed data;
        determining an anomaly score for at least one of the cognitive factors by measuring a deviation of one such analyzed cognitive factor for the driver; and
        calculating the cognitive load based on the anomaly scores of the analyzed cognitive factors;
    identifying a range of cognitive load values and designating a middle portion of the values as a mid-range; and
    performing an action based on where the cognitive loads of the messages fall within the range of values, comprising:
        withholding those messages from the driver that are associated with cognitive loads that fall above the mid-range;
        performing a further analysis of the appropriateness of delivery of those messages associated with the cognitive loads that fall in the mid-range comprising determining an appropriateness value based on at least one appropriateness factor; and
        providing those messages to the driver when the cognitive loads are lower than the mid-range.

12. A method according to claim 11, further comprising:
determining that a future time provides a better opportunity for providing the message to the driver; and
transmitting the message to the driver at the future time when the calculated cognitive load is high.

13. A method according to claim 11, further comprising:
recording mobile phone usage of the driver while driving;
identifying at least one of when and where the driver is using the mobile phone when driving; and
assigning a low cognitive subscore when the driver is determined to be using the mobile phone.

14. A method according to claim 11, further comprising:
calculating a score for the cognitive load, comprising:
    determining a condition of a road on which the driver is driving the motor vehicle;
    obtaining readings of radar sensors positioned within the car;
    determining a speed of the motor vehicle;
    determining whether the driver is performing actions while driving the motor vehicle that are similar to prior actions based on the road condition, radar sensor readings and motor vehicle speed;
    determining the cognitive score of the driver based on a similarity of the actions determined, the road condition, the radar sensor readings, and motor vehicle speed.

15. A method according to claim 11, further comprising:
determining the cognitive load via one of a decision tree and machine learning.

16. A method according to claim 11, further comprising:
determining whether a future opportunity presents a better time for providing the message to the driver; and
transmitting the message to the driver at the future time when the opportunity is determined to be better.

17. A method according to claim 16, further comprising:
estimating the future opportunity for providing the message to the driver, comprising:
    identifying at least one route that fits a current driving direction of the motor vehicle;
    analyzing the identified route; and
    identifying a location along the route as the future opportunity.

18. A method according to claim 17, further comprising:
determining the frequent route, comprising:
    identifying previously travelled route by the user; and
    identifying one or more most popular travelled routes amongst other drivers.

19. A method according to claim 11, further comprising:
determining an importance of the message for the driver, comprising:
    determining a sender of the message;
    identifying at least one of a request and proposed action within the message;
    determining a length of time required to present the message; and
    calculating the importance based on the determined sender, identified request or proposed action, and length of time.

20. A method according to claim 11, further comprising:
determining whether a future opportunity exists to present the message to the user;
determining an importance of the message to be presented to the user; and
calculating an appropriateness score for presenting the message to the user based on the cognitive load, future opportunity, and message importance.

\* \* \* \* \*